United States Patent [19]

Mayle

[11] Patent Number: 4,854,804
[45] Date of Patent: * Aug. 8, 1989

[54] LIFTING AND CARRYING HEAVY LOADS

[76] Inventor: Steven R. Mayle, 153 St. Thomas Dr., Fremont, Ohio 43420

[*] Notice: The portion of the term of this patent subsequent to Apr. 26, 2005 has been disclaimed.

[21] Appl. No.: 156,486

[22] Filed: Mar. 1, 1988

Related U.S. Application Data

[63] Continuation-in-part of Ser. No. 151,919, Feb. 3, 1988, which is a continuation-in-part of Ser. No. 23,723, Mar. 9, 1987, Pat. No. 4,740,131.

[51] Int. Cl.⁴ ............................................. B60P 3/00
[52] U.S. Cl. ..................................... 414/469; 212/218; 280/47.11; 298/19 V; 414/460; 414/461; 414/540; 414/911
[58] Field of Search ............................ 414/459–461, 414/905, 910, 911, 495, 540, 544, 506, 592, 498, 608, 426, 427, 469, 546, 559, 667, 671, 556, 557, 543, 544; 298/19 V, 21 V; 212/218, 219, 255, 211, 260, 71, 83, 97, 98, 205, 208, 220; 187/8.5, 11, 20, 21, 9 R, 9 E; 280/47.11, 659, 47.16, 43.12

[56] References Cited

U.S. PATENT DOCUMENTS

| 447,606 | 3/1891 | Gardner | 280/47.16 X |
|---|---|---|---|
| 781,690 | 2/1905 | Stickney | 414/911 X |
| 1,016,381 | 2/1912 | Watson | 280/659 |
| 1,175,312 | 3/1916 | Simpson | 280/47.11 X |
| 1,551,132 | 8/1925 | Butter | 298/19 V |
| 2,657,938 | 11/1953 | Browne et al. | 414/460 X |
| 2,702,139 | 2/1955 | Faustine | 414/461 |
| 2,775,357 | 12/1956 | De Arment | 414/911 X |
| 3,019,918 | 2/1962 | Keener | 414/543 |
| 3,541,598 | 11/1970 | Dousset | 414/459 |
| 3,750,811 | 8/1973 | Anderson et al. | 414/460 |
| 3,759,409 | 9/1973 | Wenzel et al. | 414/460 |
| 3,831,791 | 8/1974 | Gonzales | 414/461 |
| 4,044,907 | 8/1977 | Craft | 414/911 X |
| 4,295,777 | 10/1981 | Bell et al. | 414/911 X |
| 4,502,568 | 3/1985 | Lebre | 414/667 X |
| 4,505,489 | 3/1985 | Specie | 280/659 X |
| 4,573,846 | 3/1986 | Willbanks et al. | 414/911 X |
| 4,657,469 | 4/1987 | Beierle et al. | 414/911 X |
| 4,690,376 | 9/1987 | Duncan | 414/911 X |
| 4,740,131 | 4/1988 | Mayle | 414/460 |

FOREIGN PATENT DOCUMENTS

| 116353 | 3/1969 | Norway | 280/43.12 |
|---|---|---|---|
| 275559 | 8/1951 | Switzerland | 212/218 |
| 885599 | 12/1961 | United Kingdom | 187/8.5 |
| 2132568 | 7/1984 | United Kingdom | 298/19 V |

Primary Examiner—David A. Bucci
Attorney, Agent, or Firm—Marshall & Melhorn

[57] ABSTRACT

An apparatus for lifting and carrying heavy loads includes a generally horizontally extending support beam attached between a pair of generally vertically extending posts. The lower end of each post is attached to one of a pair of generally horizontally extending side beams which are connected together at a front end by a steering mechanism. A winch for moving a load is coupled to the support beam and is connected to either a pan or directly to a load for releasably engaging and lifting a load. A rear edge of the pan is rotatably attached to the side beams and a front edge can be lifted by the winch to dump a load carried on the pan. A pair of lifting arms can be connected between the posts and the side beams to cooperate with the winch to move a load between the ground and a roof.

16 Claims, 7 Drawing Sheets

LIFTING AND CARRYING HEAVY LOADS

CROSS-REFERENCE TO RELATED APPLICATION

This application is a continuation-in-part of copending application Serial No. 07/151,919, filed Feb. 3, 1988, which is a continuation-in-part of copending application Serial No. 07/023,723, filed Mar. 9, 1987, now U.S. Pat. No. 4,740,131.

BACKGROUND OF THE INVENTION

The present invention relates in general to an apparatus for lifting and carrying large, heavy loads and, in particular, to an apparatus for moving objects up to and around on the roof of a building.

Many commercial buildings are constructed with a relatively flat roof. Such roofs are typically covered with strips of roofing material which are delivered to the building site in large, heavy rolls. These rolls must be lifted to the roof of the building and then typically moved by hand by the workers installing the roofing material. Such an operation is difficult and time consuming. Such operations also can require the movement of the old roofing materials and objects such as air conditioning units.

SUMMARY OF THE INVENTION

The present invention relates to an apparatus for lifting and carrying large, heavy objects and is especially adapted for work on a building roof. The frame of the apparatus can be easily disassembled for movement between the ground and the roof of the building. Furthermore, the frame incorporates adjustments for width, length and height in order to accommodate different size loads. A generally horizontally extending support beam is releasably attached at opposite ends to a pair of spaced apart generally vertically extending posts. The lower end of each post is attached to a generally horizontally extending side frame having a ground engaging rotatably attached wheel at one end and a steering mechanism support attached at the other end.

The steering mechanism includes a steerable centrally mounted wheel assembly attached to a steering and pulling handle. The rear end of the frame includes a removable connecting bar which permits the frame to be backed up to a roll with the side frames adjacent either end of the roll. A supporting bar is adapted to extend through the center of a roll and has its ends attached to cables which are connected to a winch mounted on the support frame. The winch is utilized to raise the roll for movement along the roof and then lower the roll for dispensing the roofing material. The support bar includes adjustable means for changing the width or distance between the vertical support posts and also includes means for adjusting the height of the support bar with respect to the vertical posts.

The frame can include caster wheels at each front corner mounted slightly above ground level for engaging the ground should a supported load tip the frame toward either side. Multiple support bars can be utilized for suspending smaller diameter rolls one above the other. A hinged pan can be attached to the support beam for carrying and dumping waste materials and the pan can be modular for ease of movement between the ground and a roof. Generally horizontally extending arms can be attached to the vertical support posts for moving a load between the ground and a roof of a building utilizing the winch. Detachable braces can be extended between the vertical posts and the horizontal side rails to strengthen the frame when moving heavy loads with either the pan or the arms.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
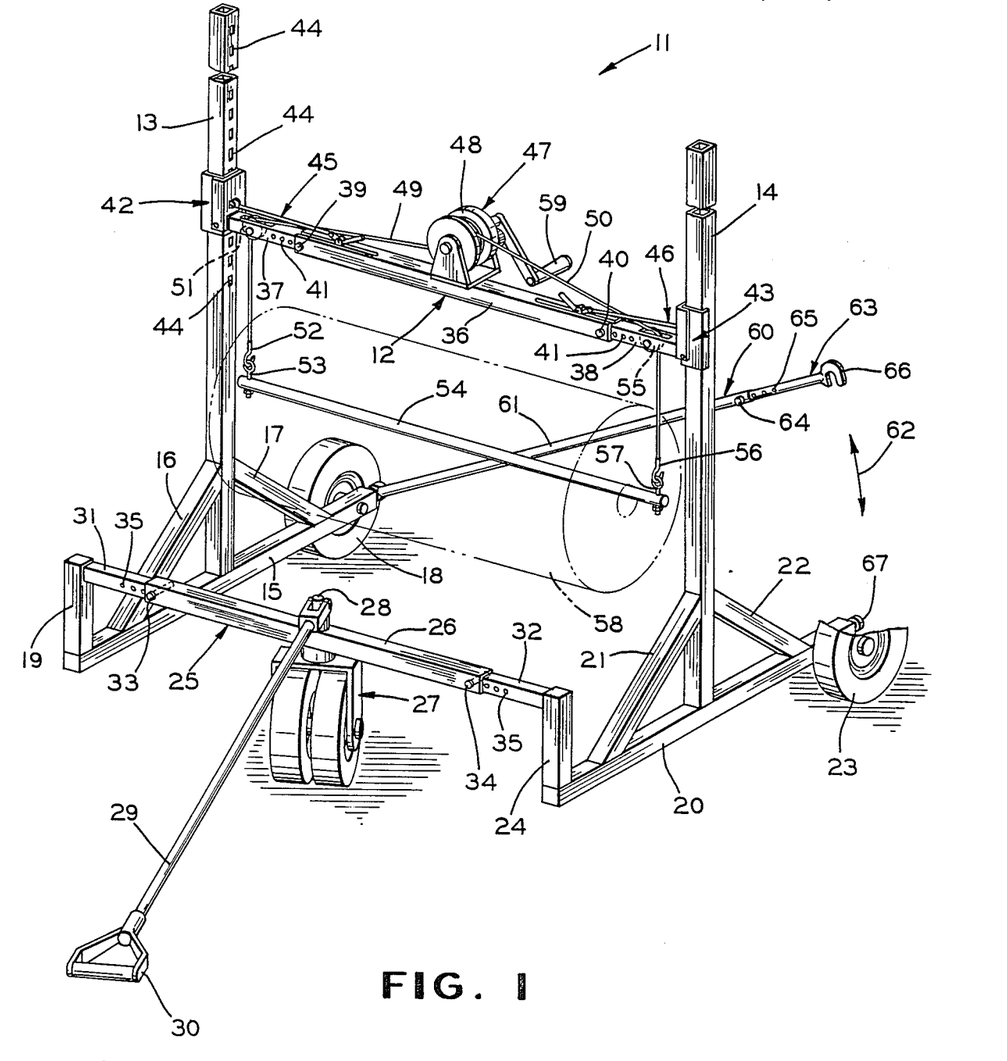
FIG. 1 is a perspective view of a load lifting and carrying apparatus according to the present invention.
Figure 2:
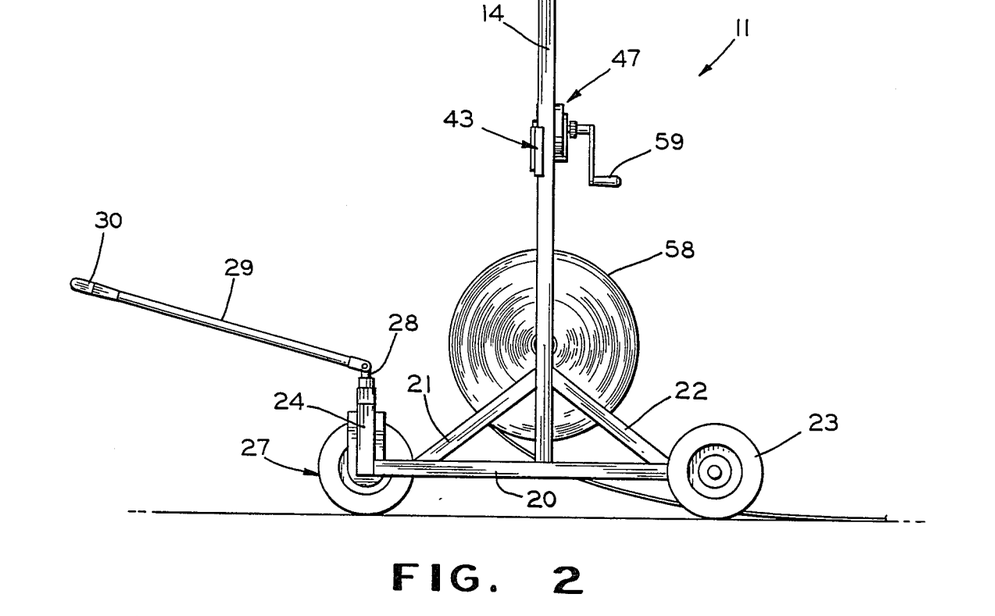
FIG. 2 is a side elevational view of the apparatus shown in FIG. 1 carrying a roll of roofing material.

A lifting and carrying apparatus 11 according to the present invention is shown in FIGS. 1 and 2. The apparatus 11 includes a generally horizontally extending support beam 12 attached at opposite ends to a pair of generally vertically extending posts 13 and 14. A lower end of the post 13 is attached to a central portion of a generally horizontally extending side beam 15. A pair of bracing beams 16 and 17 are attached to and extend between the vertical post 13 and the side beam 15 on opposite sides of the point of connection between the post 13 and the beam 15.

A ground engaging wheel 18 is rotatably attached at a rear end of the side beam 15. At the forward end of the side beam 15 there is attached a generally vertically extending short beam 19. The opposite side of the apparatus 11 is similar in construction with a lower end of the vertical post 14 attached to a side beam 20. A pair of bracing beams 21 and 22 extend between the post 14 and the side beam 20. A ground engaging wheel 23 is rotatably attached to a rear end of the side beam 20 and a short beam 24 extends vertically from and is attached to a front end of the side beam 20.

The upper ends of the short beams 19 and 24 are attached to opposite ends of a steering mechanism 25. The steering mechanism 25 includes a generally horizontally extending tubular beam 26 upon which is mounted a steering wheel assembly 27. The steering wheel assembly 27 is rotatably mounted about a vertical axis. Although dual wheels are shown, a single wheel assembly or any other type of known steering mechanism can be utilized. An upper end 28 of the steering wheel assembly 27 extends above the upper surface of the tubular beam 26 and is attached to one end of a steering rod 29. The opposite end of the steering rod 29 has a handle 30 attached thereto which handle is adapted to be griped by a human hand. The rod 29 is pivotally attached to the upper end 28 for rotation about a generally horizontal axis to enable the handle 30 to be positioned at an appropriate height for an operator. Thus, the operator can apply a force through the handle 30 and steering rod 29 to move the lifting and carrying apparatus 11 in a desired direction and can control the direction of movement through the rotation of the steering wheel assembly 27.

One end of each of a pair of generally horizontally extending adjustment beams 31 and 32 is attached to an upper end of a respective one of the short beams 19 and 24. The opposite ends of the adjustment beams 31 and 32 extend inside open ends of a tubular beam 26. A pair of locking pins 33 and 34 extend through holes formed in the tubular beam 26 and corresponding holes formed in the adjustment beams 31 and 32 respectively to lock the steering mechanism 25 in place. The beams 31 and 32 each have a plurality of other apertures 35 formed therein for cooperation with the locking pins 33 and 34 to permit adjustment of the distance between the short beams 19 and 24 thereby permitting the width of the lifting and carrying apparatus to be adjusted.

The horizontal support beam 12 also can be adjusted to maintain the distance between the vertical posts 13 and 14 in correspondence with the distance between the short beams 19 and 24. A tubular beam 36 extends in a generally horizontal direction between the vertical post 13 and 14. A pair of adjustment beams 37 and 38 each have one end attached to a corresponding one of the vertical posts 13 and 14. The opposite ends of the adjustment beams 37 and 38 extend inside the open ends of the tubular beam 36. A pair of locking pins 39 and 40 extend through apertures formed in the ends of the tubular beam 36 and through corresponding apertures formed in the adjustment beams 37 and 38 respectively. The locking pins 39 and 40 can also cooperate with any of a plurality of other apertures 41 formed in the adjustment beams 37 and 38 to vary the distance between the vertical posts 13 and 14.

The horizontal support beam 12 is vertically adjustable. The adjustment beams 37 and 38 are attached to the vertical posts 13 and 14 respectively by a pair of sleeves 42 and 43 respectively. The sleeve 42 slidably engages the vertical post 13 and is attached to the adjustment beam 37. The sleeve 43 slidably engages the vertical post 14 and is attached to the adjustment beam 38. The vertical post 13 has a plurality of apertures 44 formed therein along a generally vertically extending axis and facing the end of the adjustment beam 37. A releasable locking mechanism 45 is attached between the tubular beam 36 and the sleeve 42 for engaging a selected one of the apertures 44 thereby locking the horizontal support beam 12 at a desired vertical height. A second releasable locking mechanism 46 is attached between the tubular beam 36 and the sleeve 43 and operates in a similar manner to engage apertures (not shown) formed in the vertical post 14. The locking mechanisms 45 and 46 will be discussed in more detail with reference to FIG. 3.

A winch 47 is mounted on an upper surface of the tubular beam 36. The winch 47 includes a drum 48 to which are attached one end of each of a pair of cables 49 and 50. The cable 49 extends around a pulley 51 rotatably mounted inside the adjustment beam 37. The opposite end of the cable 49 is attached to a hook 52 which engages an eye of an eye bolt 53. The opposite end of the eye bolt 53 is attached to one end of a load carrying bar 54. Similarly, the cable 50 extends around a pulley 55 rotatably mounted inside the adjustment beam 38. The opposite end of the cable 50 is attached to a hook 56 which engages an eye of an eye bolt 57. The eye bolt 57 is attached to the opposite end of the load carrying bar 54. Thus, the hooks 52 and 56 can be disengaged from the respective eye bolts 53 and 57 to release the load carrying bar 54. The bar 54 can be inserted through the center of a roll of roofing material 58 (shown in phantom). The hooks 52 and 56 can be re-engaged with the eye bolts 53 and 57. The roll 58 can be raised by rotating a crank arm 59 attached to the drum 48. Typically, the winch 47 includes a ratching mechanism with a reversible dog for permitting both raising and lowering of the load carrying bar 54 and its associated load. Although a roll 58 of roofing material is shown, the present invention can be utilized to lift and carry many different large and/or heavy loads.

In order to provide additional rigidity to the apparatus 11, the ends of the side beams 15 and 20 to which the wheels 18 and 23 are attached are connected together by a rear beam assembly 60. The beam assembly 60 includes a tubular beam 61 having one end rotatably attached to the side beam 15 for rotation about a generally horizontal axis in the direction of an arrow 62. The opposite end of the tubular beam 61 is open and receives therein one end of an adjustment connector 63. The tubular beam 61 and the adjustment connector 63 are attached by a locking pin 64 which extends through apertures formed in the tubular beam 61 and corresponding apertures formed in the adjustment connector 63. The adjustment connector 63 has other apertures 65 formed therein for cooperating with the locking pin 64 in order to determine the distance between the ends of the side beams 15 and 20. The opposite end of the adjustment connector 63 has a generally U-shaped downwardly facing hook 66 attached thereto for engaging a generally horizontally extending post 67 attached to an end of the side beam 20. Thus, opposite sides of the apparatus 11 are held in spaced apart relationship by the horizontal support beam 12, the steering mechanism 25, and the rear beam assembly 60. When it is desired to move the lifting and carrying apparatus 11 into position to pick up a load, the rear beam assembly 60 is rotated upwardly to a generally vertical position to enable the apparatus 11 to be backed toward the load until the horizontal support beam 12 is positioned above the load. The rear beam assembly 60 is lowered into the horizontal locking position to enable the load to be moved.

Figure 3:
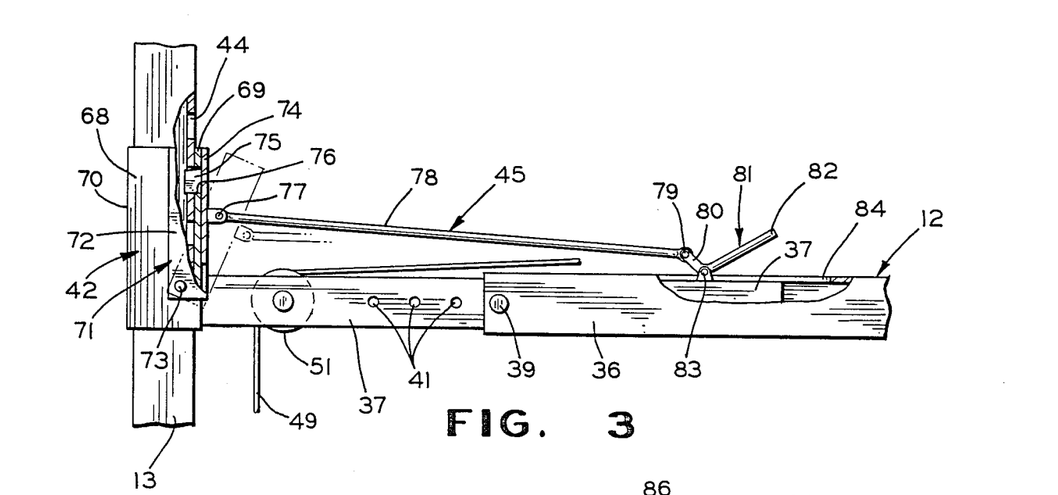
FIG. 3 is an enlarged fragmentary front elevational view of the vertical positioning mechanism of the apparatus shown in FIG. 1.

Referring to FIG. 3, there is shown in more detail the sleeve 42 and the releasable locking mechanism 45. The sleeve 42 has a generally U-shaped body having a front wall 68 attached to generally parallel spaced apart inner side wall 69 and outer side wall 70. The spacing between the side walls 69 and 70 corresponds to the width of the vertical post 13 to enable the sleeve 42 to slidably engage the outer surfaces of the post 13. An L-shaped bracket 71 has a front wall 72 abutting the front wall 68 and pivotally connected at 73 thereto. A side wall 74 of the bracket 71 abuts the inner side wall 69 of the sleeve 42. A lug 75 is formed on a surface of the side wall 74 facing the vertical post 13. The lug 75 extends through an aperture 76 formed in the inner side wall 69 and engages one of the apertures 44 formed in the vertical post 13. Thus, the sleeve 42 is locked against vertical movement along the vertical post 13.

An outer surface of the side wall 74 is pivotally connected at 77 to one end of a link arm 78 of the releasable locking mechanism 45. The opposite end of the link arm 78 is pivotally connected at 79 to a shorter arm 80 of a lever 81. The lever 81 is generally L-shaped and has a longer arm 82 attached to the shorter arm 80. The junction of the arms 80 and 82 is pivotally connected at 83 to an upper surface of the adjustment beam 37. The pivotal connection 83 extends through a slot 84 formed in an upper surface of the tubular beam 36. The slot 84 is dimensioned to permit movement of the pivotal connection 83 in accordance with the selected engagement of the locking pin 39 with any of the apertures 41. When downwardly directed pressure is applied to the lever arm 82, the lever 81 pivots about the pivot point 83 thereby causing the bracket 71 to pivot about the pivot point 73 and move to a disengaged position as shown in phantom. Such movement disengages the lug 75 from the selected one of the apertures 44 thereby permitting the entire horizontal support beam 12 to be moved away from the vertical post 13. The sleeve 43 and releasable locking mechanism 46 are similar in construction and operation.

Figure 4:
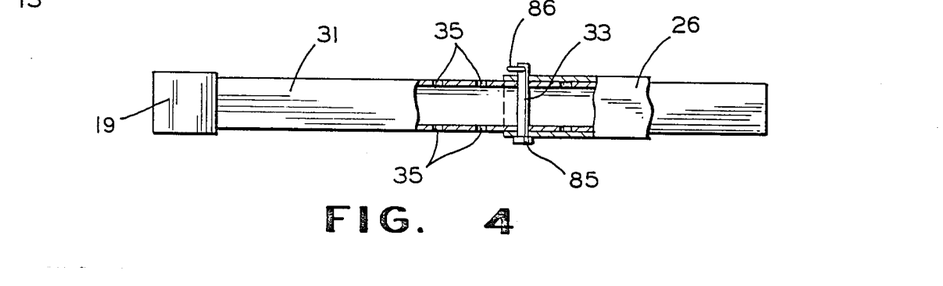
FIG. 4 is an enlarged top plan view of the width adjustment mechanism of the apparatus of FIG. 1.

There is shown in FIG. 4 the adjustment connection of the tubular beam 26 and the adjustment beam 31. The tubular beam 26 includes a pair of apertures through which the locking pin 33 extends. The adjustment beam 31 has a plurality of pairs of apertures 35 formed therein any pair of which can be aligned with the apertures in the tubular beam 26 for accepting the locking pin 33. One end of the locking pin 33 has an enlarged head 85 formed thereon. The opposite end of the locking pin 33 can have an aperture formed therein for accepting a retention means such as a cotter pin 86.

The lifting and carrying apparatus 11 according to the present invention can be disassembled for transportation both to the job site and from the ground to the roof of a building. The locking pins 33 and 34 can be removed to disengage the tubular beam 26 and associated steering wheel assembly 27. The releasable locking mechanisms 45 and 46 can be actuated to disengage the horizontal support beam 12 from the vertical posts 13 and 14. The rear beam assembly 60 can be releasably attached to the side beam 15 for disassembly. If necessary, one or more of the subassemblies can be designed to be broken down into additional subassemblies for ease of storage and transportation. The subassemblies are easily reassembled and the apparatus 11 is ready for lifting and carrying large and heavy loads.

Figure 5:
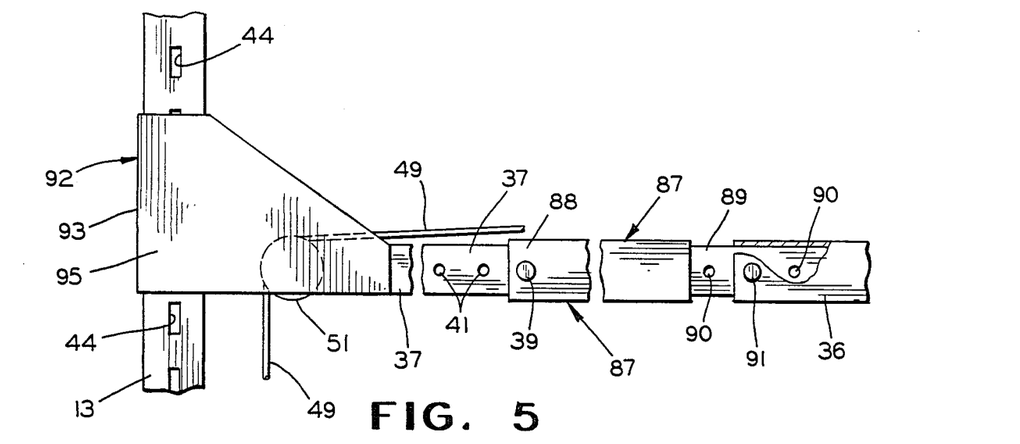
FIG. 5 is an enlarged fragmentary front elevational view of an alternate embodiment of the vertical positioning mechanism of the apparatus shown in FIG. 1.

In FIG. 5 there is shown an alternative embodiment of the vertical positioning mechanism and adjustment beams for the support beam 12. The apparatus 11 shown in FIG. 1 can be manufactured in a standard size adjustable between a minimum and a maximum width. If it is desired to lift and carry loads which exceed the standard maximum width, a pair of extension beams can be utilized. For example, a tubular extension beam 87 is connected between the horizontal tubular beam 36 and the adjustment beam 37. An outwardly facing end 88 of the beam 87 has internal dimensions which permit insertion of the inwardly facing end of the adjustment beam 37. The locking pin 39 is inserted through an aperture (not shown) formed through the end 88 and engages one of the apertures 41 to firmly connect the adjustment beam 37 to the extension beam 87. An inwardly facing end 89 of the extension beam 87 is formed of reduced dimensions similar to the dimensions of the adjustment beam 37 and extends inside the outwardly facing end of the tubular beam 36. The inwardly facing end 89 has a plurality of apertures 90 formed therethrough and one of the apertures 90 accepts a locking pin 91 which extends through an aperture (not shown) formed in the tubular beam 36. The extension beams 87 can be formed in several standard lengths to provide, for example, increases in width in a continuous series of ranges. Of course, corresponding adjustments are necessary in the steering mechanism 25 and the rear beam assembly 60.

Figure 6:
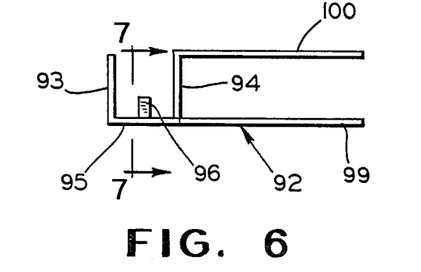
FIG. 6 is a top plan view of the releasable attaching mechanism shown in FIG. 5.
Figure 7:
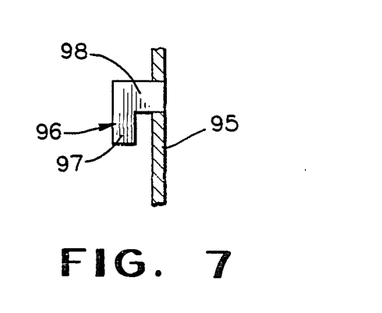
FIG. 7 is a cross-sectional view taken along the line 7—7 in FIG. 6.

Also shown in FIG. 5 is an adjustable attachment for connecting the support beam 12 to the vertical posts 13 and 14. The vertical post 13 is formed with the apertures 44 facing either the front or the rear of the apparatus 11. A sleeve 92 has a pair of substantially parallel extending side walls 93 and 94 joined by an end wall 95 to form a generally U-shaped sleeve for extending around these sides of the vertical post 13. As shown in FIG. 6 and FIG. 7, a generally L-shaped locking lug 96 is attached to an inner surface of the end wall 95 and has a downwardly extending portion 97 which is sized to pass through the apertures 44. The sleeve 92 is then lowered and a generally horizontally extending portion 98 of the locking lug 96 comes into contact with a bottom wall of the aperture 44. The sleeve 92 is thereby locked in place on the vertical post 13 until sufficient upward force is applied to raise the sleeve 92 such that the portion 97 can clear the bottom of the aperture 44. Of course, a similar sleeve and locking lug is provided at the opposite end of the support beam 12.

A pair of brace walls 99 and 100 extend in a generally parallel direction from opposite ends of the inner side wall 94. The brace walls 99 and 100 are attached to front and rear surfaces of the adjustment beam 37 in the area of the pulley 51. Thus, means for releasably attaching each end of a support beam to a corresponding one of the vertical posts 13 and 14 is provided.

Figure 8:
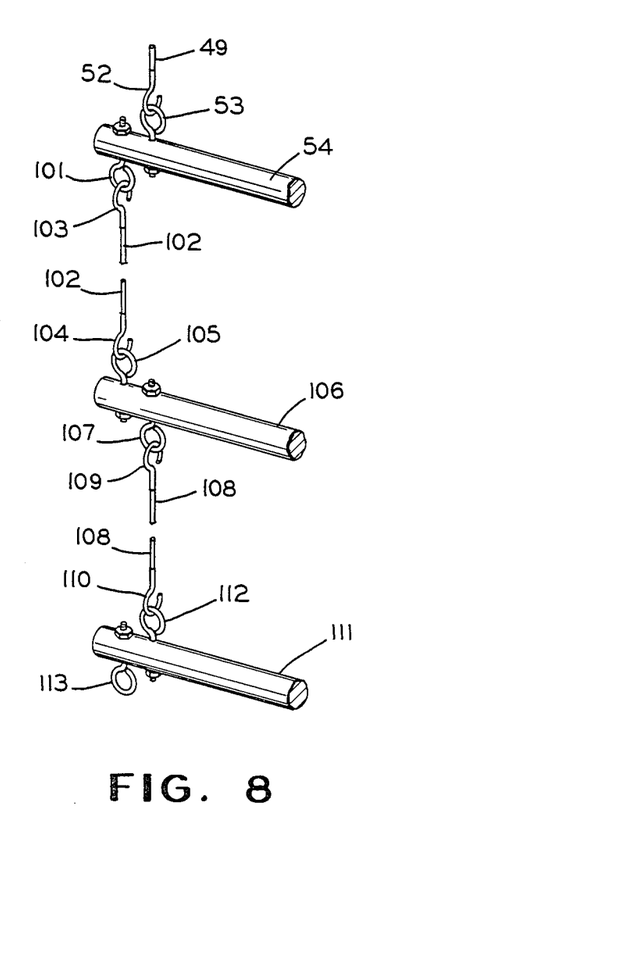
FIG. 8 is an enlarged fragmentary perspective view of an alternate embodiment of the load carrying bar shown in FIG. 1.

There is shown in FIG. 8 an alternate embodiment of the load carrying bar 54 shown in FIG. 1. A second eye bolt 101 is attached to the load carrying bar 54. The eye bolt 101 is shown positioned between the eye bolt 53 and the end of the bar 54. However, the eye bolt 101 could have been positioned interiorly of the eye bolt 53. A relatively short length of cable 102 has a hook 103 attached at one end and a second hook 104 attached at the opposite end. The hook 103 engages the eye bolt 101 and the hook 104 engages an eye bolt 105 attached to a load carrying bar 106. Thus, a roll of roofing material can be carried on the bar 54 and a second roll of roofing material can be carried on the bar 106 suspended below the bar 54 by properly selecting the length of the cable 102.

The bar 106 has a second eye bolt 107 attached thereto. It can be seen that the eye bolt 107 corresponds to the eye bolt 53 and the eye bolt 105 corresponds to the eye bolt 101 such that the bar 54 and the bar 106 are substantially identical. A second cable 108 can be provided having a first hook 109 attached to one end and a second hook 110 attached to an opposite end. Thus, a third bar 111 having eye bolts 112 and 113 attached thereto can be suspended below the second bar 106 to retain a third roll of roofing material. Of course, FIG. 8 is representative of the attachments at the opposite ends of the bars 54, 106, and 111. The number of bars, and thus the number of rolls of roofing material which can be suspended, is only limited by the diameter of each of the rolls of roofing material.

Figure 9:
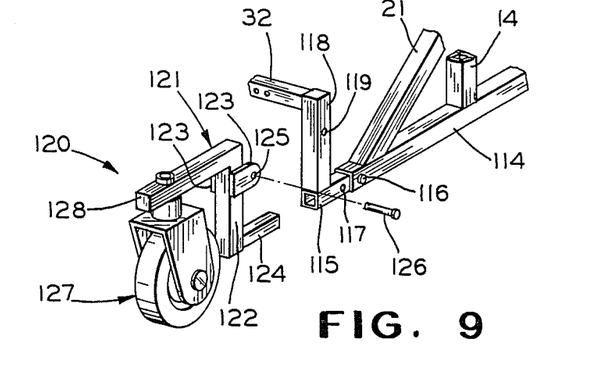
FIG. 9 is a fragmentary exploded perspective view of an alternate embodiment of the frame of FIG. 1 showing a side beam extension and caster wheel.

There is shown in FIG. 9 an alternate embodiment of the frame of the lifting and carrying apparatus 11 of FIG. 1. A generally horizontal side beam 114 is attached to the lower end of the post 14 and to the bracing beam 21. The side beam 114 is similar to the side beam 20 of FIG. 1, but a forward end of the side beam 114 is adapted to telescopically receive an extension tube 115. The extension tube 115 and the side beam 114 can be held together by any suitable fastener such as a locking pin 116 extending through apertures (not shown) formed in both the side beam 114 and the extension tube 115. A plurality of apertures, represented by an aperture 117 can be formed in the extension tube 115 to enable the length of the side beams to be adjusted selectively.

A generally vertically extending short connector beam 118 is connected between a free end of the extension tube 115 and an outer end of the adjustment beam 32. An aperture 119 is formed in the short connector beam 118 for attaching a caster assembly 120. The caster assembly 120 includes a bracket 121 having a generally vertically extending center body portion 122. A pair of ears 123 are attached to opposite sides of the center body portion 122 and are spaced apart a distance equal to the width of the connector beam 118. A lower leg 124 extends from a lower end of the center body portion 122 and is telescopically received in an open end of the extension tube 115. An aperture 125 is formed in each of the ears 123 at a position corresponding with the aperture 119 to receive a locking pin 126. Thus, the bracket 121 is firmly connected to the frame of the apparatus by the locking pin 126 cooperating with the ears 123 and the lower leg 124 cooperating with the extension tube 115. A caster wheel 127 is rotatably attached to an outer end of an upper leg 128 which has its opposite end attached to a top end of the center body portion 122. A similar caster assembly is attached to the side beam on the opposite side of the apparatus frame. The caster assemblies are dimensioned such that the caster wheels are approximately one half inch above the ground when the front steering wheels and the rear side beam wheels are resting on a level surface. If a heavy load would tend to tip the frame to one side or the other, one of the caster wheels would be lowered into engagement with the ground thereby stabilizing the apparatus.

Figure 10:
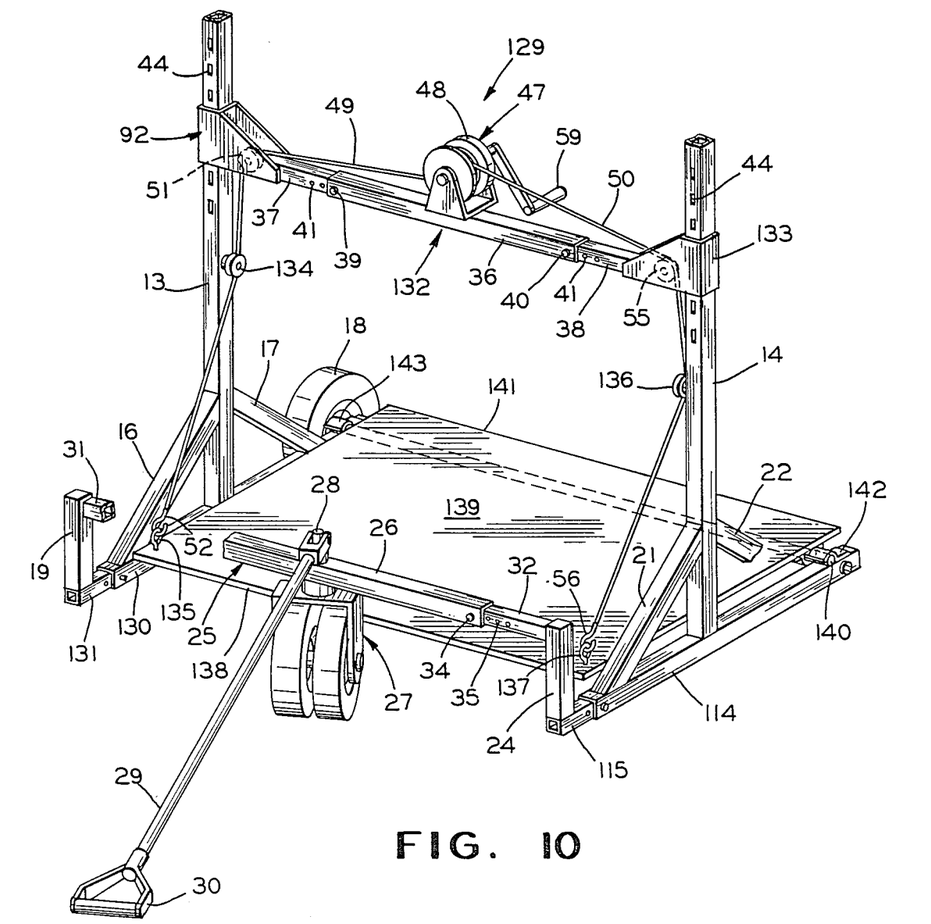
FIG. 10 is a fragmentary perspective view of an alternate embodiment of the apparatus of FIG. 1 showing a load supporting pan.

There is shown in FIG. 10 an alternate embodiment of the apparatus 11 shown in FIG. 1. Like elements have the same reference numerals. An apparatus 129 for lifting and carrying includes the side beam 114 and the extension tube 115 attached to the vertical post 14 as shown in FIG. 9. A similar side beam 130 and extension tube 131 are attached to the vertical post 13. A support beam assembly 132 is releasably attached at one end to the vertical post 13 by the sleeve 92 and is releasably attached at its opposite end to the vertical post 14 by a similar sleeve 133. The cable 49 attached to the winch 47 passes over the pulley 51 and around a second pulley 134 rotatably attached to an inner surface of the vertical post 13. The cable 49 terminates in the hook 52 which engages an eye bolt 135. Similarly, the cable 50 extends over the pulley 55 and around a second pulley 136 rotatably attached to an inner surface of the vertical post 14. The cable 50 terminates in the hook 56 which engages an eye bolt 137. The eye bolts 135 and 137 are attached at opposite corners of a forward edge 138 of a generally horizontally extending planar pan 139. A rod 140 extends underneath and across the width of the pan 39 adjacent a rear edge 141. The ends of the rod 140 are rotatably retained in a pair of clips 142 and 143 attached to the rearward ends of the side beams 114 and 130 respectively. The rod 140 is attached to the lower surface of the pan 139 such that when the winch is operated to retract the cables 49 and 50, the forward edge 138 of the pan 139 is raised and the pan pivots about the rod 140. Thus, any load supported upon the upper surface of the pan 139 will be dumped at the rear edge 141. The pan 139 is especially useful for hauling used roofing materials which have been removed from an old roof across the roof to be dumped over the side of the associated building.

Figure 11:
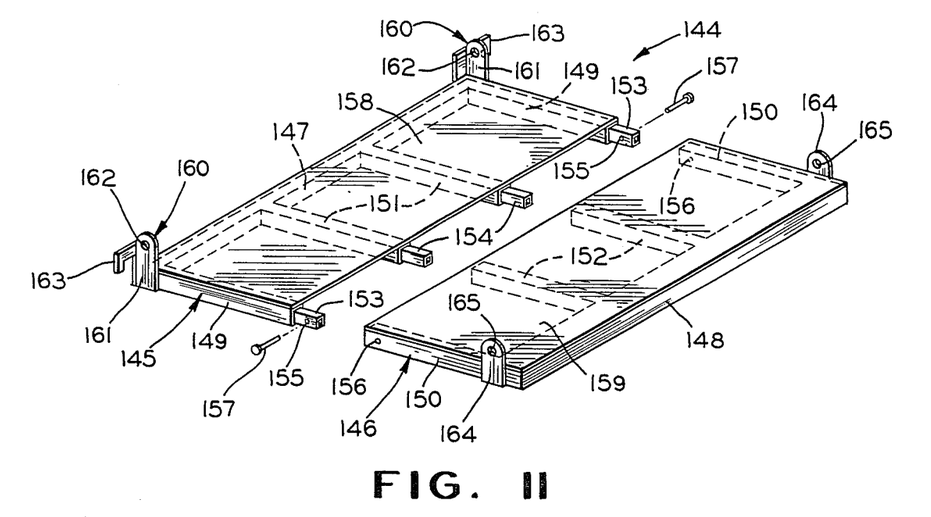
FIG. 11 is an exploded perspective view of an alternate embodiment of the pan shown in FIG. 10.

There is shown in FIG. 11 an alternate embodiment of the pan of FIG. 10. A load carrying pan 144 includes a front pan frame section 145 and a rear pan frame section 146 which are both generally C-shaped. The front section 145 has a center tubular section 147 which defines a front edge of the pan 144. The rear section 146 has a similar central tubular portion 148 which defines a rear edge of the pan 144. A pair of generally parallel extending legs 149 are attached at opposite ends of the center portion 147 and extend toward the rear pan frame section 146. Similarly, a pair of generally parallel extending legs 150 are attached at opposite ends of the center portion 148 and extend toward the front pan frame section 145. The front pan frame section 145 also has a pair of generally parallel extending inner legs 151 attached to a central area of the center portion 147 and extending toward the rear pan frame section 146. Similarly a pair of inner legs 152 are attached to a central area of the center portion 148 and extend toward the front pan frame section 145.

The legs 149, 150, 151 and 152 are generally tubular with a square cross-section. The rearwardly facing ends of the legs 149 and 151 each retain an outwardly extending connector tube 153 and 154 respectively which tubes are adapted to be inserted into the open ends of the legs 150 and 152 respectively. Each of the connector tubes 153 as an aperture 155 formed therein which aligns with a similar aperture 156 formed adjacent the open end of each of the legs 150. Thus, the front pan frame section 145 can be securely joined to the rear pan frame section 146 by inserting locking means such as pins 157 into the apertures 155 and 156.

A generally horizontally extending load supporting panel 158 is attached to an upper surface of the front pan frame section 145. Similarly, a generally horizontally extending load supporting panel 159 is attached to an upper surface of the rear pan frame section 146. When the frame sections are joined, the adjacent edges of the panels 158 and 158 abut and the panels form a continuatious load supporting surface.

A pair of connector/support brackets 160 are attached at opposite ends of the center portion 147. A generally vertically extending connector plate 161 has a lower end attached to the frame section 145 and has an aperture 162 formed in an upper end thereof. The apertures 162 cooperate with the hooks 52 and 56 shown in FIG. 10 to enable the front end of the pan 144 to be raised. Each connector/support bracket 160 also includes a generally upside down L-shaped support plate 163 attached to the corners of the front pan frame section 145 and extending outwardly from the sides of the frame section to form a support. The support plate 163 is adapted to contact an upper surface of the side rail 114 or the extension tube 115 shown in FIG. 10 in order to support the front end of the pan 144 thereby relieving the load on the winch 47 as the load is being transported on the pan 144. A pair of generally vertically extending connector plates 164 each have a lower end attached to the legs 150 near the center portion 148. An aperture 165 is formed in an upper end of each of the plates 164 for cooperation with a pair of generally horizontally extending pins as will be discussed below. Thus, the alternate embodiment pan 144 can be operated in a manner similar to the pan 139 shown in FIG. 10 to carry and dump a load.

Figure 12:
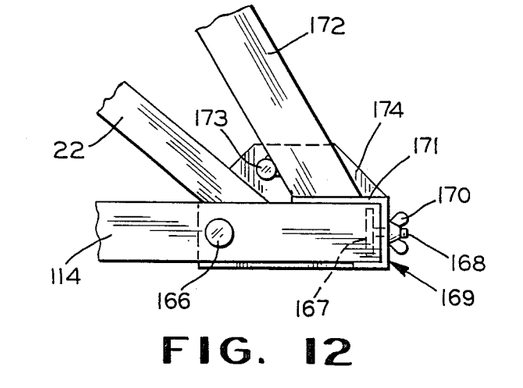
FIG. 12 is an enlarged fragmentary front elevational view of a rear corner of an alternate embodiment of the apparatus shown in FIG. 10 for use with the pan of FIG. 11 and an optional brace.

There is shown in FIG. 12 an enlarged fragmentary front elevational view of a rear corner of an alternate embodiment of the apparatus shown in FIG. 10 for use with the pan 144 shown in FIG. 11 and including an optional brace. The end of the horizontal side rail 114, to which the bracing beam 22 is attached, has a generally horizontally extending axle 166 attached to an outer side surface thereof. A stud plate 167 is attached to inner walls of the tubular side rail 114 adjacent the open rearwardly facing end thereof. A threaded stud 168 extends from the plate 167 in a rearward direction beyond the open end of the side rail 114. The stud 168 extends through an aperture (not shown) formed in a central portion of a generally U-shaped bracket 169. A wing nut or similar fastener 170 threadably engages the stud 168 to retain the bracket 169 coupled to the end of the side rail 114.

The bracket 169 has an upper leg 171 which extends generally horizontally along an upper surface of the end of the side beam 114. A lower end of an optional brace member 172 is attached to an upper surface of the leg 171. A short, generally horizontally extending pivot rod 173 is attached to a forwardly facing surface of the brace member 172 adjacent the end attached to the leg 171.

Figure 13:
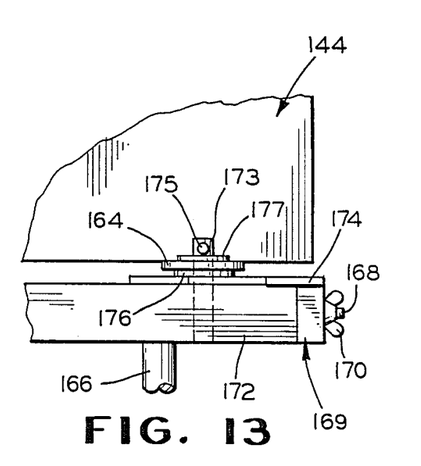
FIG. 13 is a top plan view of the frame rear corner shown in FIG. 12.

As shown in FIGS. 12 and 13, the pivot rod 173 is generally parallel to the axle 166 and extends through an aperture (not shown) formed in a gusset plate 174. The pivot rod 173 continues through the aperture 165 (shown in FIG. 11) formed in the vertical connector plate 164 attached to the pan 144. The pan 144 can be retained on the pivot rod 173 by a cotter pin 175 or similar retainer cooperating with the end of the pivot rod 173. The pivot rod 173 can also extend through a spacer plate 176, utilized between the gusset plate 174 and the vertical connector plate 164, and a washer 177 can be placed on the pivot rod 173 between the plate 164 and the cotter pin 175.

Figure 14:
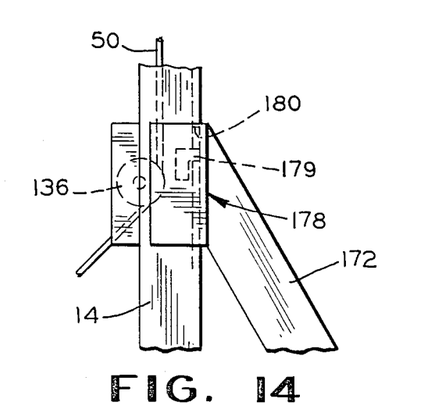
FIG. 14 is an enlarged fragmentary front elevational view of an upper portion of the vertical post shown in FIG. 10 including the optional brace shown in FIG. 12.
Figure 15:
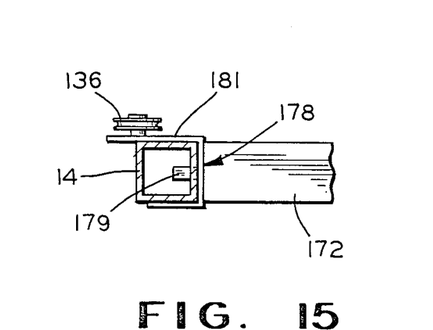
FIG. 15 is a top plan view of the post and brace shown in FIG. 14.

There is shown FIGS. 14 and 15, the releasable connection means for the upper end of the brace member 172. An upper end of the brace member 172 is attached to a central portion of a generally U-shaped sleeve 178. The sleeve 178 is adapted to extend around three sides of the generally vertical post 14. A generally L-shaped locking lug 179 extends from an inwardly facing surface of a central portion of the sleeve 178 and is adapted to engage a slot 180 which is formed in a rearwardly facing surface of the post 14. Thus, the lug 179 and the slot 180 cooperate in a manner similar to the lug 96 and the slot 44 shown in FIGS. 7 and 10 respectively. Furthermore, the pulley 136 can be mounted on an inwardly facing surface of an inner leg 181 of the sleeve 178 rather than being mounted on the post 14 as shown in FIG. 10. Of course, the elements shown in FIGS. 12 through 15 are duplicated on the opposite side of the apparatus to cooperate with the post 13 and the side beam 130.

Figure 16:
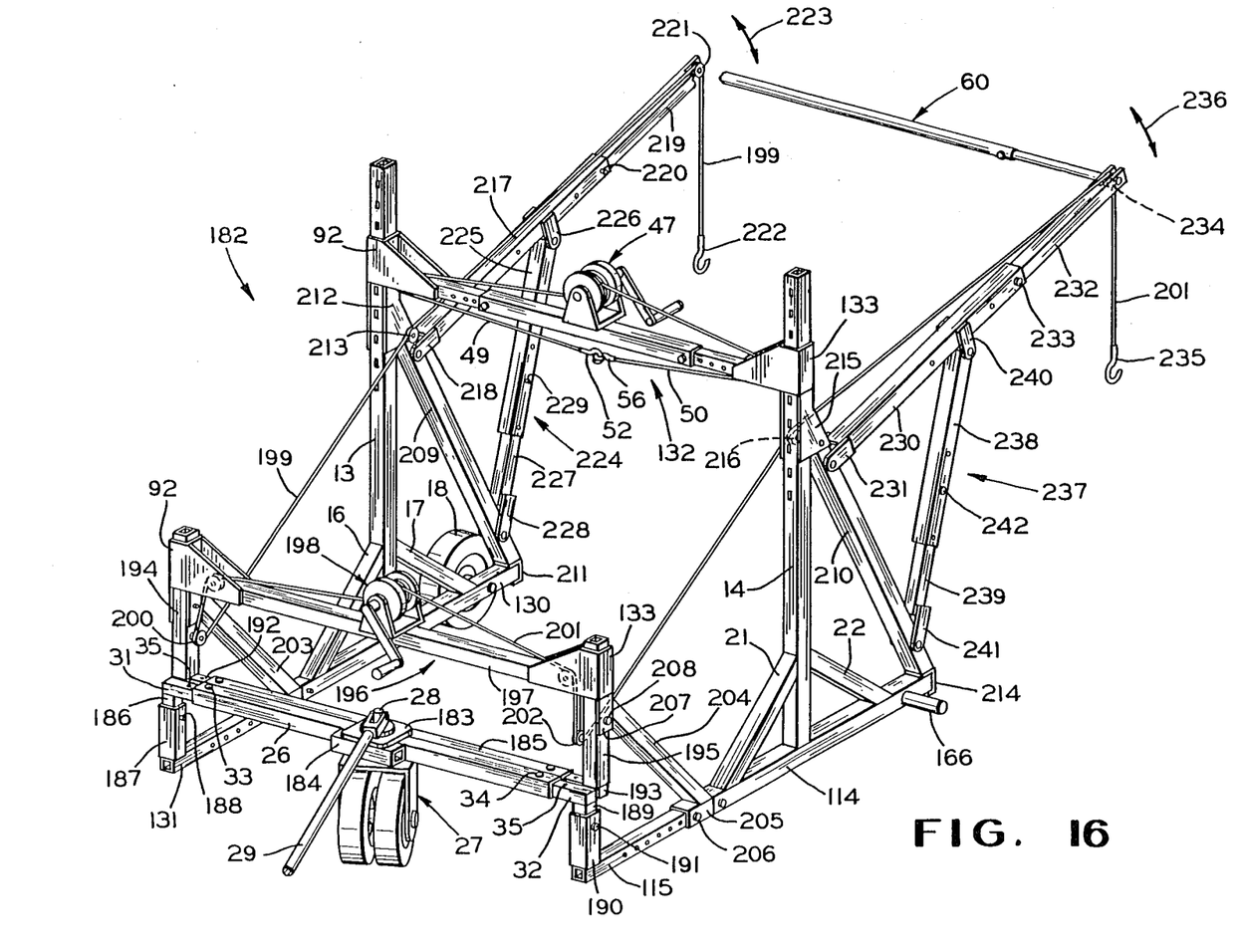
FIG. 16 is a fragmentary perspective view of a second alternate embodiment the apparatus shown in FIG. 1 including the brace of FIGS. 12–15 and optional lifting arms.

A second alternate embodiment of the apparatus shown in FIG. 1 is shown in FIG. 16. An apparatus 182 incorporates several of the elements of the apparatus 129 of FIG. 10 and includes the vertical post 13 attached to the side beam 130 and interconnecting bracing beams 16 and 17. The ground engaging wheel 18 is rotatably connected to the side beam 130. At the opposite side, the vertical post 14 is connected to the side beam 114 with interconnecting bracing beams 21 and 22. The support beam assembly 132 is attached at the upper ends of the posts 13 and 14 by the sleeves 92 and 133 respectively. Although the winch 47 is shown as being manually operated, any suitable means for winding and unwinding the cables 49 and 50 could be utilized such as an electric winch. The hooks 52 and 56 are shown coupled together to prevent interference between cables 49 and 50 and the optional lifting mechanism for supporting a load which will be discussed below.

The steering wheel assembly 27 is attached to the tubular steering beam 26 and includes the upper end 28 and the steering rod 29. The end 28 extends through a bearing support assembly 183 which is attached to an upper surface of the beam 26. Further support for the steering wheel assembly 27 and bearing support assembly 183 is provided by a short support beam 184 attached to a front surface of the steering beam 26. The bearing support assembly 183 can also be attached to an upper surface of a tubular mounting beam 185 which is coextensive with the tubular steering beam 26. The beams 26 and 185 can also be attached together.

As discussed with respect to the apparatus 11 and the apparatus 129, the steering assembly must be adjustable in width to correspond with different spacings between the vertical posts 13 and 14. The horizontally extending adjustment beams 31 and 32 and the tubular steering beam 26 have been rotated ninety degrees such that the apertures 35 and the locking pins 33 and 34 extend in a generally vertical direction. This orientation prevents interference with the tubular mounting beam 185. The outer end of the adjustment beam 31 is attached to an upper end of connector tube 186 which extends downwardly into an open upper end of a tubular connector beam 187. The tube 186 and the beam 187 are connected together by a locking pin 188 which extends through apertures (not shown) formed in both the tube and the beam. The lower end of the connector beam 187 is attached to an upper surface of the forward end of the extension tube 131. The tube 186 and the beam 187 provide an alternate means for disassembling the steering assembly. Similarly, the adjustment beam 32 is attached to an upper end of a connector tube 189 which extends into an open upper end of a tubular connector beam 190. The lower end of the connector beam 190 is attached to an upper surface of a forward end of the extension tube 115. A locking pin 191 extends through apertures (not shown) formed in the connector tube 189 and the connector beam 190 providing means for disassembly.

A pair of adjustment beams 192 and 193 extend into the open opposite ends of the tubular mounting beam 185. An outwardly extending end of the adjustment beam 192 is attached to a generally vertically extending post 194. Similarly, an outwardly extending end of the beam 193 is attached to a lower end of a generally vertically extending post 195. A support beam assembly 196 has opposite ends coupled to the posts 194 and 195 by a pair of the sleeves 92 and 133 respectively. The support beam assembly 196 could be the same as the support beam assembly 132 if it is desired to provide for width adjustment of the apparatus 182. In the alternative, a mounting beam 197 can have opposite ends attached to the sleeves 92 and 133. A winch 198 is centrally mounted on an upper surface of the mounting beam 197 and can be similar to the winch 47, or can be any other suitable type of winch such an electric powered winch. A first cable 199 is attached to the winch and extends around a pulley mounted in the sleeve 92. The cable extends downwardly from the sleeve 92 and about a pulley 200 rotatably attached to an inwardly facing surface of the post 194. The pulley 200 directs the cable 199 in a rearward and upward direction toward the post 13. A second cable 201 extends from the winch 198 around a pulley in the sleeve 133 and around a pulley 202 rotatably mounted on an inwardly facing surface of the post 195 thereby being directed in a generally rearwardly and upwardly direction toward the post 14.

As will be described below, the cables 199 and 201 are utilized for lifting loads, for example, from the ground to a roof of a building. The weight of such loads will tend to bend the connector beams 187 and 190 and the posts 194 and 195 toward the rear of the apparatus 182. Additional support can be provided by a pair of bracing beams 203 and 204. The beam 204 is detachably connected between the post 195 and extension tube 115. For example, a lower end of the beam 204 can be connected to an inverted generally U-shaped bracket 205 which is attached to the extension tube 115 by a locking pin 206 which extends through apertures formed in the bracket 205 and the tube 115. The upper end of the beam 204 can be attached to a similar U-shaped sleeve 207 which is detachably connected to the post 195 by a locking pin 208 extending through apertures (not shown) formed in the sleeve 207 and the post 195. Similarly, the beam 203 is detachably connected between the post 194 and the extension tube 131.

The posts 13 and 14 are supported during lifting by a pair of brace members 209 and 210 respectively. A lower end of the brace member 209 is attached to a generally U-shaped bracket 211 similar to the bracket 169 shown in FIGS. 12 and 13. The bracket 211 extends around the rearward end of the side beam 130. An upper end of the brace member 209 is attached to a generally U-shaped sleeve 212 which is releasably attached to the post 13 in a manner similar to the sleeve 178 shown in FIGS. 14 and 15. A pulley 213 is rotatably mounted on an inwardly facing surface of the sleeve 212 to further direct the cable 199 in a rearwardly direction. In a similar manner, the lower end of the brace member 210 is attached to a U-shaped bracket 214 which in turn is attached to the rearward end of the side beam 114. An upper end of the brace member 210 is attached to a generally U-shaped sleeve 215 which is releasably attached to the post 14. A pulley 216 is rotatably attached to an inwardly facing surface of the sleeve 215 to direct the cable 201 in a rearward direction. The sleeves 212 and 215 are similar to the sleeve 178 shown in FIGS. 14-15 and releasably attach to the posts 13 and 14 respectively in a similar manner. The spacing between the sleeves 92 and 212 and between the sleeves 133 and 215 can be such as to prevent upward movement of the sleeves 212 and 215 during use.

A tubular lifting arm 217 has one end attached to the brace member 209 adjacent the sleeve 212 by a pivot means 218. An opposite end of the arm 207 telescopically receives an extension arm 219. The arms 217 and 219 are provided with apertures for receiving a locking pin 220 which selectively fixes the combined length of the arms 217 and 219. A pulley 221 is rotatably mounted at an outer end of the arm 219 for directing the cable 199 in a generally downward direction. A hook 222 can be provided at the free end of the cable 199 for attachment to a load. The angle of the arms 217 and 219 with respect to a generally horizontal plane can be determined by rotating the arms about the pivot point of the pivot means 218 as shown by an arrow 223. A plurality of angles can be maintained by adjusting the length of a support arm 224. The support arm 224 includes a tubular outer arm portion 225 having an upper end pivotally connected to a pivot means 226 attached to the lifting arms 217. A lower end of the arm portion 225 telescopically receives an inner arm portion 227 which has a lower end pivotally attached to the brace member 209 by a pivot means 228. The arm portions 225 and 227 can be maintained in any one of several combined lengths by a locking pin 229 which extends through apertures formed in both of the arm portions 225 and 227.

There is associated with the vertical post 14, a tubular lifting arm 230 which has one end pivotally attached to the brace member 210 by a pivot means 231. An extension arm 232 is telescopically received in an open opposite end of the lifting arm 230 and a locking pin 233 is provided to extend through apertures formed in the arms 230 and 232 to selectively connect them in any one of a plurality of desired lengths. The cable 201 extends over a pulley 234 rotatably attached to an outer end of the extension arm 232 and a free end of the cable 201 is attached to a hook 235. The arms 230 and 232 rotate about the pivot point of the pivot means 231 as shown by an arrow 236 to any one of a plurality of selected angular relationships with a generally horizontally extending plane. The arms 230 and 232 are held in the selected angular relationship by a support arm 237 which consists of a tubular outer arm portion 238 which telescopically receives an inner arm portion 239. An upper end of the arm portion 238 is pivotally connected by a pivot means 240 to the lifting arm 230. A lower end of the arm portion 239 is pivotally connected to the brace member 210 by a pivot means 241. The arm portions 238 and 239 are maintained in any one of a plurality of selected combined lengths by a locking pin 242 which extends through apertures formed in both of the arm portions. The outer ends of the extension arms 219 and 232 can be maintained in spaced relationship by a rear beam assembly such as the assembly 60 which is also shown in FIG. 1 attached to the ends of the side beams 15 and 20.

Figures 17, 18, 19:
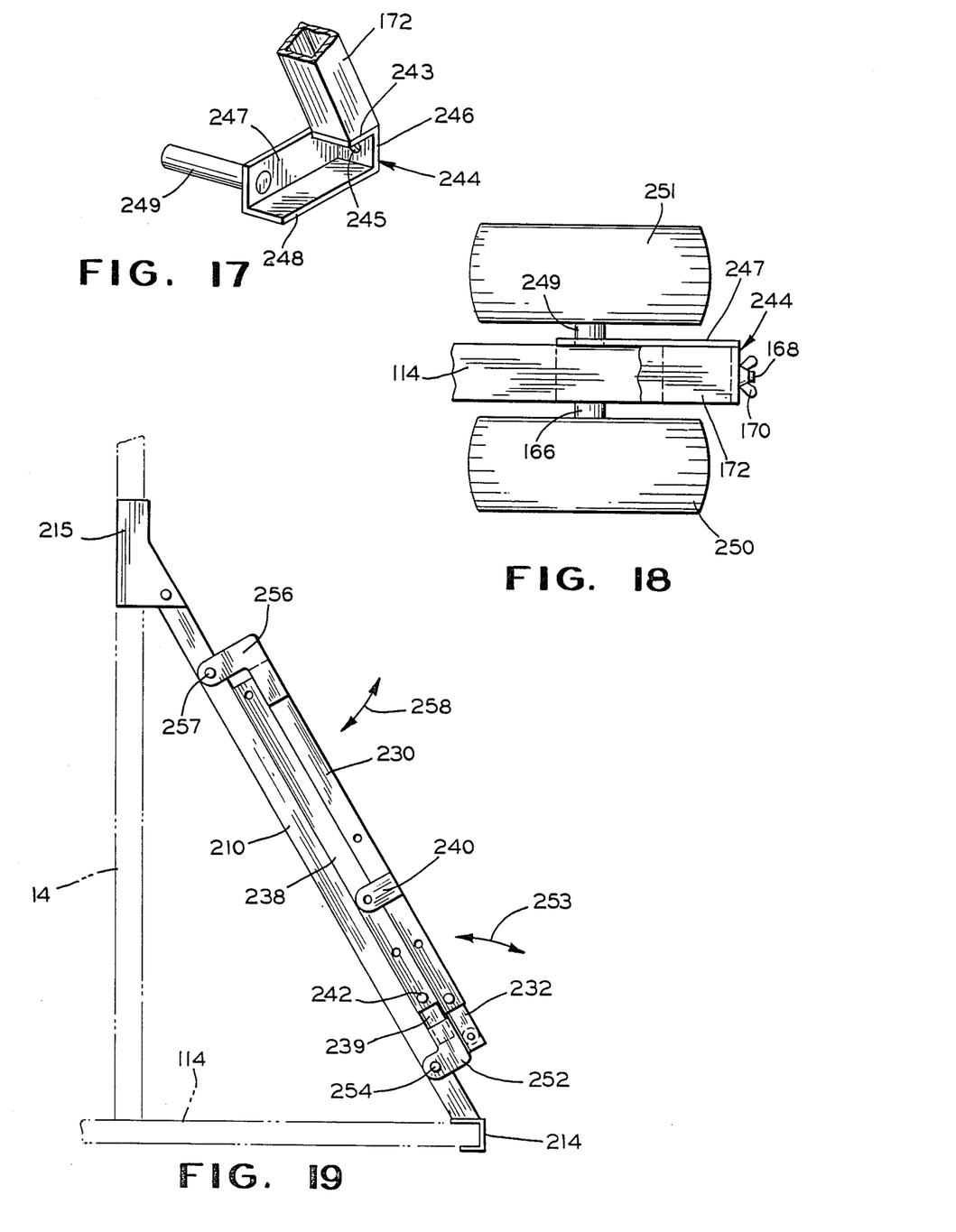
FIG. 17 is an enlarged fragmentary perspective view of an axle assembly for an optional rear wheel.
FIG. 18 is a top plan view of the rear corner of the apparatus shown in FIG. 12 incorporating the axle assembly of FIG. 17 and a pair of wheels.
FIG. 19 is a side elevational view of one of the optional lifting arms shown in FIG. 16 in a folded position.

There is shown in FIGS. 17 and 18, an optional dual wheel assembly for the rear wheels of the load lifting and carrying apparatus in any of the disclosed embodiments. The lower end of the brace member 172 can be attached to an upper surface of one leg of a generally U-shaped bracket 244. The bracket 244 extends around a rearward end of the side beam 114 in a manner similar to the bracket 169 shown in FIGS. 12 and 13. An aperture 245 is formed in a central portion 246 of the bracket 244 for receiving the threaded stud 168. A gusset plate 247 is attached to the inwardly facing edges of the one leg 243, the central portion 246 and the other leg 248 of the bracket 244. The gusset plate 247 has an inwardly extending axle 249 attached to it. A ground engaging wheel 250 can be rotatably attached to the axle 166 and a second ground engaging wheel 251 can be rotatably attached to the axle 249 to provide dual wheel support. A mirror image bracket similar to the bracket 244 can be provided for the side beam 130 for dual wheel support at the opposite side of the apparatus.

In FIG. 19, there is shown an optional folding lift arm assembly. The brace member 210 is connected between the bracket 214 and the sleeve 215 which are releasably attached to the side beam 114 and the post 14 respectively. The arm portions 238 and 239, which are connected to each other by the locking pin 242, are shown folded against the rearwardly facing surface of the brace member 210. Such folded position is possible utilizing a generally L-shaped pivot means 252 which is attached to the lower end of the inner arm portion 239 and is pivotally connected to the lower end of the brace member 210. Thus, the arm portions 238 and 239 can move in an arc defined by an arrow 253 about a pivot point 254.

Similarly, the lifting arm 230 and the extension arm 232 are pivotally attached to the brace member 210 by a generally L-shaped pivot means 256. The pivot means 256 is attached to an upper end of the lifting arm 230 and is pivotally attached to the brace member 210 at a pivot point 257. The pivot means 256 spaces the arms 230 and 232 from the brace member 210 a distance equal to the thickness of the arm portion 238 to enable compact stacking of the various elements. The arms 230 and 232 pivot about the pivot point 257 as shown by an arrow 258. In the folded position shown in FIG. 19, the optional brace and lifting assembly is relatively easy to move and store.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for lifting and carrying loads comprising:
   a generally horizontally extending support beam;
   a pair of generally vertically extending posts each attached at a lower end to one of a pair of generally horizontally extending side beams, and releasably attached to opposite ends of said support beam;
   a plurality of ground engaging wheels coupled to said side beams;
   means for releasably engaging and lifting a load attached to said support beam; and
   means for supporting a load coupled to said means for releasably engaging and lifting including, a pan pivotally connected to said side beams, said pan including a front frame section having a front edge coupled to said means for releasably engaging and lifting, a rear frame section having a rear edge pivotally attached to said side beams, and means for releasably attaching said front and rear frame sections together, and each of said front and rear frame sections is generally C-shaped with a center portion connected between a pair of legs and an inner pair of legs connected to said center portion, each of said legs of one of said frame sections adapted to telescopically engage a connector tube with a corresponding one of said legs of the other one of said frame sections.

2. The apparatus according to claim 1 wherein said pan includes a pair of connector plates adapted to pivotally couple opposite sides of said pan to adjacent ones of said side beams and a pair of connector/support brackets adapted to releasably engage said side beams and releasably couple to said means for releasably engaging and lifting.

3. The apparatus according to claim 1 wherein said means for supporting includes a pair of lifting arms each attached to one of said posts and having means for maintaining said lifting arms in one of a plurality of selected angular positions with respect to a generally horizontal plane.

4. The apparatus according to claim 3 wherein each of said lifting arms has at least two arm portions telescopically coupled together.

5. The apparatus according to claim 3 wherein said means for maintaining includes a pair of support arms each having at least two arm portions telescopically coupled together.

6. The apparatus according to claim 3 wherein said means for releasably engaging and lifting includes a winch attached to said support beam, a pair of cables each having one end coupled to said winch and an opposite free end, at least one pair of pulleys rotatably attached to said lifting arms for guiding said cables, and means attached to said free ends for engaging a load.

7. The apparatus according to claim 1 including a pair of braces each having a lower end attached to a bracket releasably attached to one of said side beams and an upper end attached to a sleeve releasably attached to one of said posts.

8. The apparatus according to claim 1 wherein said means for supporting includes a pair of lifting arms each having one end pivotally coupled to one of said posts, and a pair of support arms each having one end pivotally coupled to one of said side beams and an opposite end releasably attached to one of said lifting arms, whereby associated ones of said lifting arms and said support arms can be folded together for moving and storage.

9. The apparatus according to claim 1 including a pair of ground engaging wheels rotatably attached to each of said side beams.

10. An apparatus for lifting and carrying loads comprising:

a generally horizontally extending support beam including means for adjusting the length of said support beam;

a pair of generally vertically extending posts each attached at a lower end to one of a pair of generally horizontally extending side beams;

means for releasably attaching opposite ends of said support beam to associated ones of said posts;

at least a pair of ground engaging wheels rotatably attached to said side beams;

a steering mechanism attached to said side beams and including means for adjusting the length of said steering means;

means for supporting a load coupled to said side beams including a pair of braces each releasably connected between one of said posts and one of said side beams, a pair of telescoping lifting arms each pivotally attached at one end to one brace of said pair of braces, and a pair of telescoping support arms each pivotally connected between one of said lifting arms and one of said braces; and means for releasably engaging and lifting a load attached to said support beam and coupled to said means for supporting a load including a winch attached to said side beams and stated from said posts and having a pair of cables for engaging a load, each cable extending over one of a pair of pulleys rotatably attached to said lifting arms.

11. The apparatus according to claim 10 wherein said means for supporting includes a generally planar pan pivotally coupled to said side beams adjacent a rear edge of said pan and releasably coupled to said means for releasably engaging and lifting adjacent a front edge of said pan.

12. The apparatus according to claim 10 including means for releasably attaching said steering mechanism to said side beams.

13. An apparatus for lifting and carrying loads comprising:

a first generally horizontally extending support beam;

a first pair of generally vertically extending posts each attached at a lower end to one of a pair of generally horizontally extending side beams, and attached to opposite ends of said first support beam;

a first pair of braces each releasably attached between one post of said first pair of posts and the associated one of said side beams;

at least a pair of ground engaging wheels rotatably attached to said side beams;

a second generally horizontally extending support beam;

a second pair of generally vertically extending posts each attached at a lower end to one of said beams, and attached to opposite ends of said second support beam;

a second pair of braces each releasably attached between one post of said second pair of posts and the associated one of said side beams;

means for supporting a load coupled to said first pair of braces; and means for releasably engaging and lifting a load coupled to said means for supporting a load and attached to one of said first and second support beams.

14. The apparatus according to claim 13 wherein said means for supporting includes a pair of telescopically extending lifting arms each having one end pivotally attached to one brace of said first pair of braces, a pair of telescopically extending support arms each having one end pivotally attached to one brace of said first pair of braces and an opposite end releasably and pivotally attached to one of said lifting arms, and a pair of pulleys each rotatably attached to one of said lifting arms for cooperation with said means for releasably engaging and lifting.

15. The apparatus according to claim 13 including a steering mechanism having at least one ground engaging wheel and attached to said side beams.

16. The apparatus according to claim 15 including means for releasably attaching said steering mechanism to said side beams.

* * * * *